US012756409B2

(12) United States Patent
Pfeffer et al.

(10) Patent No.: US 12,756,409 B2
(45) Date of Patent: Oct. 6, 2026

(54) RADIO-FREQUENCY INTEGRATED CIRCUIT AND METHOD FOR SETTING A PHASE IN A RADIO-FREQUENCY CHANNEL

(71) Applicant: Infineon Technologies AG, Neubiberg (DE)

(72) Inventors: Clemens Pfeffer, Linz (AT); Christoph Wagner, Enns (AT)

(73) Assignee: Infineon Technologies AG, Neubiberg (DE)

( * ) Notice: Subject to any disclaimer, the term of this patent is extended or adjusted under 35 U.S.C. 154(b) by 399 days.

(21) Appl. No.: 18/490,452

(22) Filed: Oct. 19, 2023

(65) Prior Publication Data

US 2024/0137056 A1 Apr. 25, 2024
US 2024/0235593 A9 Jul. 11, 2024

(30) Foreign Application Priority Data

Oct. 25, 2022 (DE) ......................... 102022211321.7

(51) Int. Cl.
*H04B 1/04* (2006.01)
*H04B 1/10* (2006.01)

(52) U.S. Cl.
CPC ......... *H04B 1/0483* (2013.01); *H04B 1/1027* (2013.01); *H04B 2001/1072* (2013.01)

(58) Field of Classification Search
CPC ...... H04B 1/04; H04B 1/0475; H04B 1/0483; H04B 1/06; H04B 1/10; H04B 1/1027; H04B 1/14; H04B 2001/1072; H03H 7/18; H03H 7/20; G01S 7/032; G01S 7/352; G01S 13/343; G01S 13/584
See application file for complete search history.

(56) References Cited

U.S. PATENT DOCUMENTS 6,509,812 B2 * 1/2003 Sayyah .................. H03H 11/20 333/156
7,106,242 B2 * 9/2006 Kinghorn .............. G01S 13/282 342/135

(Continued)

OTHER PUBLICATIONS

Ellinger, Frank, et al., "Integrated Adjustable Phase Shifters," Microwave Magazine, vol. 11, Oct. 2010, No. 6, pp. 97-108. https://ieeexplore.ieee.org/abstract/document/5564376.

*Primary Examiner* — Quochien B Vuong
(74) *Attorney, Agent, or Firm* — Harrity & Harrity, LLP

(57) ABSTRACT

A radio-frequency integrated circuit includes a first radio-frequency channel and a first phase shifter in the first radio-frequency channel for setting a phase of the first radio-frequency channel based on predetermined phase values of a modulation scheme for signals of the first radio-frequency channel. A second phase shifter is provided in the first radio-frequency channel for fine-tuning the phase of the first radio-frequency channel based on fine-tuning information, the second phase shifter having a plurality of passive phase-shifting elements which are each able to be connected into the first radio-frequency channel or able to be disconnected from the first radio-frequency channel. The second phase shifter is configured to change a phase of the first radio-frequency channel by switching a selection of the plurality of passive phase-shifting elements into the first radio-frequency channel in accordance with the fine-tuning information.

20 Claims, 6 Drawing Sheets

(56) References Cited

U.S. PATENT DOCUMENTS

| | | | | |
|---|---|---|---|---|
| 9,917,613 | B1 * | 3/2018 | Bacon | H04B 15/00 |
| 10,097,287 | B1 * | 10/2018 | Schat | G01S 13/931 |
| 11,158,944 | B2 * | 10/2021 | Schrattenecker | G01S 7/4073 |
| 11,290,093 | B1 | 3/2022 | Chakraborty et al. | |
| 12,362,478 | B2 * | 7/2025 | Liu | H01P 3/026 |
| 2008/0180190 | A1 | 7/2008 | Chan et al. | |
| 2015/0180439 | A1 | 6/2015 | Reiha | |
| 2016/0226142 | A1 | 8/2016 | Leroux | |
| 2017/0063342 | A1 | 3/2017 | Cook et al. | |
| 2018/0076869 | A1 | 3/2018 | Aue et al. | |
| 2020/0007116 | A1 | 1/2020 | Agrawal et al. | |
| 2021/0181326 | A1 * | 6/2021 | Kurvathodil | G01S 13/931 |

* cited by examiner

LUT fine-tuning depending on constellation point and temperature

500

| | T=0°C | T=10°C | T=20°C | T=30°C |
|---|---|---|---|---|
| Phi=0° | 2.5° | 1.9° | 1.1° | 0.5° |
| Phi=45° | 1.9° | 1.2° | 0.3° | -0.4° |
| Phi=90° | 1.4° | 0.7° | 0.2° | -0.7° |
| Phi=135° | 0.8° | 0.2° | -0.4° | -1° |
| Phi=180° | -0.5° | -0.7° | -1.1° | -1.5° |
| Phi=225°° | 0.7° | 0.2° | -0.4° | -1.1° |
| Phi=270° | -1.3° | -1.8° | -2.5° | -2.9° |
| Phi=315° | -0.5° | -0.9° | -1.6° | -2.2° |

FIG. 5

RADIO-FREQUENCY INTEGRATED CIRCUIT AND METHOD FOR SETTING A PHASE IN A RADIO-FREQUENCY CHANNEL

CROSS-REFERENCE TO RELATED APPLICATION

This application claims priority to German Patent Application No. 102022211321.7 filed on Oct. 25, 2022, the content of which is incorporated by reference herein in its entirety.

TECHNICAL FIELD

The present disclosure relates to radio-frequency circuits and methods for setting a phase in a radio-frequency channel.

BACKGROUND

Radio-frequency circuits in the range of 60 GHz and more are used in many applications nowadays. For example, they are used to transmit data in accordance with modern communication protocols or to generate and emit radar signals, for example in the range from 76 GHz to 81 GHz, for the purpose of detecting objects. In radar applications, the angle-resolved detection of objects requires MIMO signals (MIMO=Multiple In Multiple Out) to be transmitted via a plurality of antennas, which can be achieved for example by way of different phase settings for the emitted signals. In each of the above applications, it is necessary to set the phase in a highly precise manner when transmitting the signals in order to avoid unwanted and disadvantageous effects. For example, in radar applications, imprecise phase setting can result in additional spectral components, as a consequence of which the accuracy of the angle detection can be considerably reduced. Intricately calibrated, complex phase shifters are typically required for this purpose.

It is therefore an object of the present application to provide an improved concept for phase setting in a radio-frequency channel.

This object is achieved by the features of claim 1 and claim 19.

SUMMARY

A radio-frequency integrated circuit includes a first radio-frequency channel and a first phase shifter in the first radio-frequency channel for setting a phase of the first radio-frequency channel based on predetermined phase values of a modulation scheme for signals of the first radio-frequency channel. A second phase shifter is provided in the first radio-frequency channel for fine-tuning the phase of the first radio-frequency channel based on fine-tuning information, the second phase shifter having a plurality of passive phase-shifting elements which are each able to be connected into the first radio-frequency channel or able to be disconnected from the first radio-frequency channel. The second phase shifter is configured to change a phase of the first radio-frequency channel by switching a selection of the plurality of passive phase-shifting elements into the first radio-frequency channel in accordance with the fine-tuning information.

A method for setting a phase in a radio-frequency channel includes feeding a signal into the radio-frequency channel and using a first phase shifter to set a phase of the first radio-frequency channel based on predetermined phase values of a modulation scheme for signals of the first radio-frequency channel. A second phase shifter is used to fine-tune the phase of the first radio-frequency channel based on fine-tuning information, the fine-tuning including switching a selection of a plurality of passive phase-shifting elements into the first radio-frequency channel in accordance with the fine-tuning information.

Those skilled in the art will discern further features and advantages of the implementation upon reading the following detailed description and examining the attached drawings.

BRIEF DESCRIPTION OF THE DRAWINGS

The present disclosure is shown in an example and non-limiting manner in the illustrations of the attached drawings, in which identical reference numbers refer to similar or identical elements. The elements in the drawings are not necessarily depicted to scale in relation to each other. The features of the various examples shown can be combined, provided that they are not mutually exclusive.

FIG. 5 shows a lookup table according to one example.

DETAILED DESCRIPTION

Figure 1A:
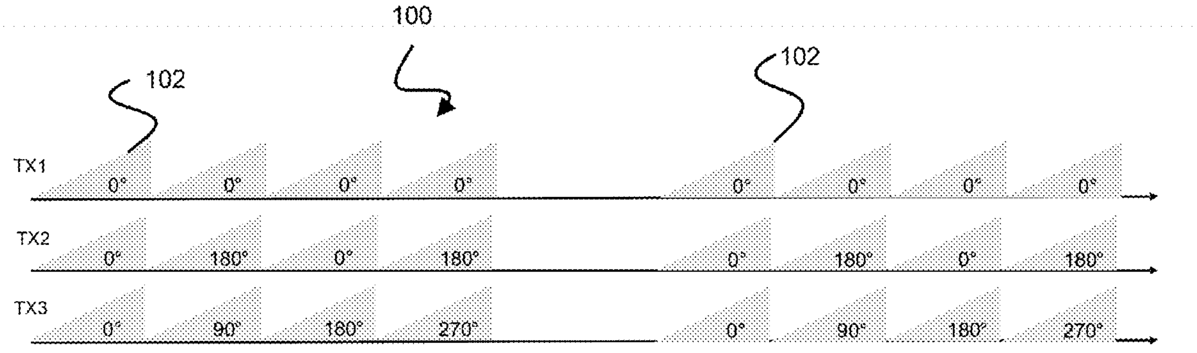
FIG. 1A shows a Doppler division modulation scheme according to one example.

The implementations described here describe a novel concept for highly precise phase setting for radio-frequency circuits, in particular at frequencies above 60 GHz. In contrast to conventional concepts, which for each radio-frequency channel use only a single phase shifter which is suitable for carrying out all phase settings from 0 to 3600 and has to be calibrated accordingly, the concept described here uses two serially separated phase shifters in one radio-frequency channel in order to set the phase.

Firstly, a first phase shifter carries out phase setting based on a discrete phase value predefined by the modulation scheme. Secondly, a second phase shifter is used to fine-tune the phase value in order to make corrections to the phase setting, which corrections may be the result of changing operating conditions such as temperature changes, voltage fluctuations, etc. For this purpose, the second phase shifter uses passive phase-shifting elements which are able to be digitally connected or disconnected and which allow a multiplicity of discrete phase changes in a limited phase range. Passive phase-shifting elements are intended to be understood to mean those in which the phase shift is produced by passive elements such as coils or capacitors, for example, with active elements (transistors) being used to effectively switch the passive elements into a signal path.

Separating the phase setting into "rough setting" in accordance with the modulation scheme and "fine-tuning" using digitally controlled passive phase-shifting elements has many advantages over conventional concepts. First of all, each of the phase shifters can be configured in a customized manner using a circuit design or concept that is specifically matched to the respective function of rough setting or fine-tuning. The circuits and concepts for achieving the phase shift in the first phase shifter and second phase shifter may be different, for example, so that they can be matched to the respective function of rough setting or fine-tuning in the best possible manner. The passive phase-shifting elements of the second phase shifter may also be selected for the fine-tuning such that required values of coils and capacitors are matched to the fine-tuning phase range in a customized manner, while phase-shifting elements of the first phase shifter have different values so as to be matched to the rough setting in a customized manner.

Moreover, the present concept makes it possible to considerably reduce chip area. The first phase shifter for the rough setting may be configured for only a small number of discrete phase settings in accordance with the constellation points of the modulation scheme and does not need to set every or almost every phase value between 0 and 360°, but rather only the discrete phase points of the constellation diagram of the modulation scheme. The first phase shifter may have digitally controllable passive phase-shifting elements for this purpose, which means that only a small number of passive phase-shifting elements are required. As described above, the phase-shifting elements of the first phase shifter and those of the second phase shifter differ in terms of size and/or design, however. Furthermore, the second phase shifter for the fine-tuning only needs to cover a relatively small phase range, for example from −10° to +10° or from −5° to 5°. Since this range is not infinite, but rather can be appropriately covered using a predetermined number of discrete phase settings (for example 4 or 8) without artefacts being produced as a result of imprecise phase settings, only a small number of phase-shifting elements are necessary for the required phase accuracy, which likewise contributes to reducing the chip area required.

A further advantage of the present concept consists in that both the first phase shifter and the second phase shifter can be configured as passive phase shifters and precise phase setting becomes possible when the two phase shifters cooperate. This not only leads to an advantage in terms of chip area, as mentioned above, but the current consumption is also reduced compared to using an active phase shifter. Furthermore, passive phase shifters are more robust compared to active phase shifters.

Figure 1B:
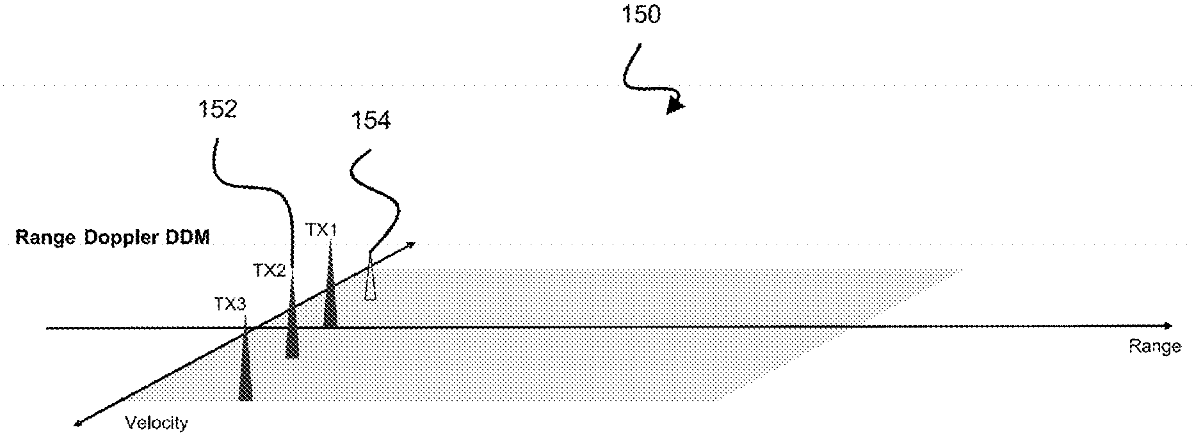
FIG. 1B shows a range-Doppler map.

With reference to FIGS. 1A and 1B, one possible application range for precise phase settings and problems associated therewith will initially be described.

FIG. 1A shows a time diagram 100 for a MIMO application of an FMCW radar system (FMCW=Frequency Modulated Continuous Wave) with Doppler division modulation. The radar system has a multiplicity of transmitting channels TX1, TX2, TX3 which emit a multiplicity of chirps 102 for each frame. Each multiplicity of chirps has a multiplicity of phase settings such that each chirp 102 is emitted with a predetermined phase value (phase offset) corresponding to the modulation scheme.

For MIMO radar systems of this kind, phase displacements can result in undesired effects, which will be explained in more detail below. In an FMCW radar system, an FMCW radar signal reflected by an object is received via an antenna and routed to a receiving channel which down-converts the received signal to a baseband. After analog-to-digital conversion, the baseband signal becomes a set of digital data. The set of digital data is routed to a first and second discrete Fourier transform in order to obtain a so-called range-Doppler map in which applicable peaks denote objects and the coordinates of the peaks can be used to determine the range (first Fourier transform or fast axis) and the velocity (second Fourier transform or slow axis) of objects. In a MIMO system, the antennas of the transmitting channels and of the receiving channels form a so-called virtual antenna array. For each of the plurality of receiving channels, the plurality of transmitting channels can be seen separately in the corresponding range-Doppler map since these are modulated with different phase sets in the Doppler division modulation mentioned above. As a result, it is possible to obtain information with regard to the angle of incidence of the signal. Non-exact phase setting in the transmitting channels can cause peaks with undesired spectral components to occur in addition to the object peaks. FIG. 1B shows, by way of example, a range-Doppler map for each of the three transmitting channels TX1, TX2 and TX3, for each of which a peak 152 attributed to an object can be seen. Additionally, imprecise phase settings may result in spectral components which can be seen as a further peak 154 and lead to the detection of objects being imprecise or erroneous.

For the phase setting, use is typically made of active phase shifters, so-called I/Q modulators, which have an in-phase path (I path) and a quadrature path (Q path). The processing in the I path or Q path requires complex 0°/90° splitters, amplifier-based or mixer-based balancing circuits and power combiners. The response is heavily influenced by imbalances in the I path and Q path, and complex digital-to-analog converters and complex calibration are additionally required.

An example of one implementation will now be explained below with reference to FIG. 2, the implementation making it possible to overcome the disadvantages mentioned above by using passive phase shifters for fine-tuning or correction setting. The implementation is based on the fact that it is not necessary to continually set the whole range from 0 to 3600 in order to achieve precise phase setting for MIMO applications and in particular MIMO radar applications such as DDM-MIMO applications, for example. It is sufficient rather, in a first setting (rough setting), to use a first phase shifter to set those discrete values which are required for the MIMO phase settings in accordance with the modulation scheme and to correct the errors resulting therefrom, for example due to manufacturing variations, temperature changes or voltages changes, using a second, separate phase shifter having passive phase-shifting elements (fine-tuning).

Figure 2:
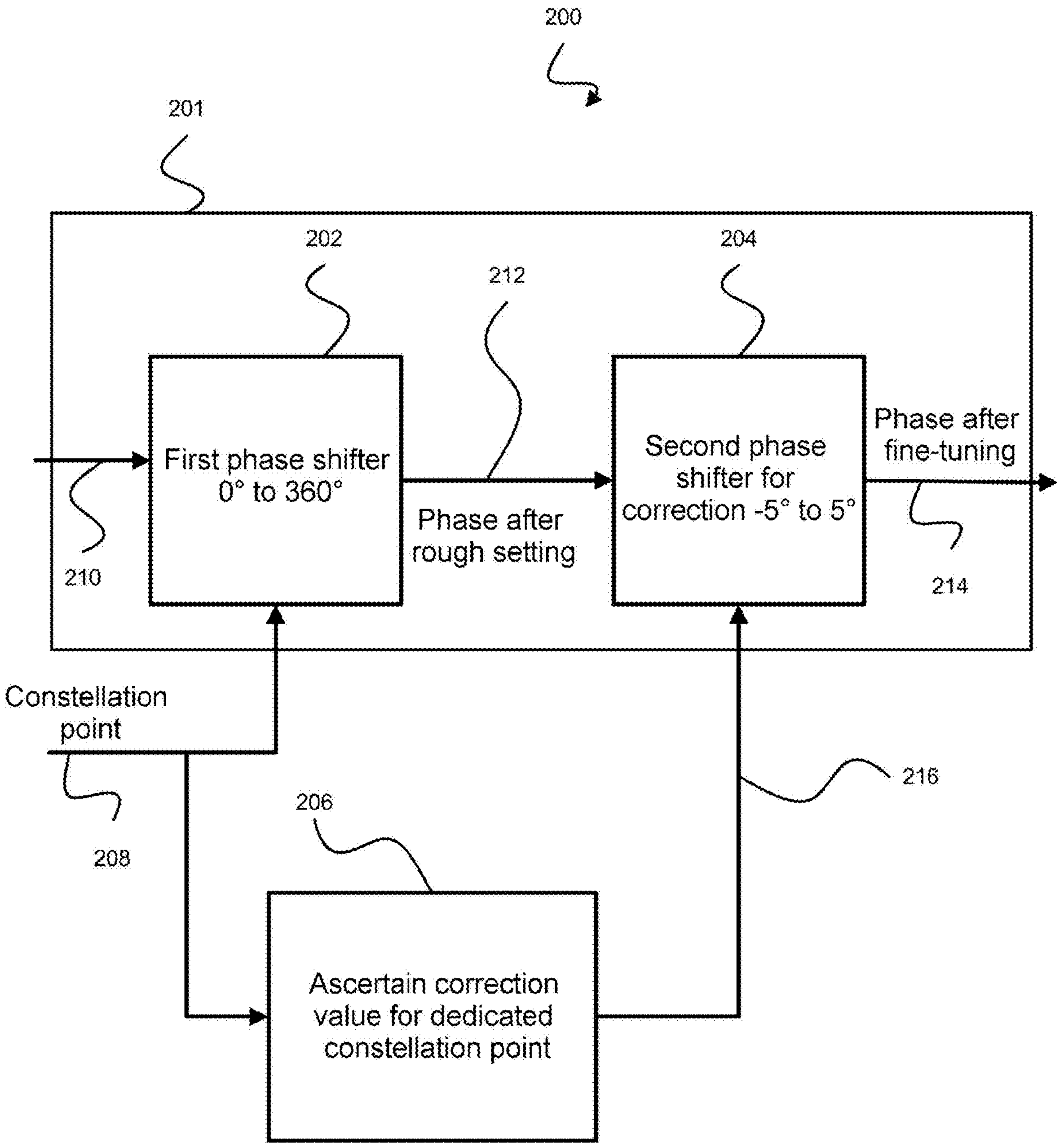
FIG. 2 shows a block circuit diagram according to one example.

FIG. 2 shows a radio-frequency integrated circuit 200 having a radio-frequency channel 201 in which a signal 210 is routed to a first phase shifter 202. The radio-frequency integrated circuit 200 can be integrated on a semiconductor chip and have, in addition to the radio-frequency channel 201 shown, further radio-frequency channels, which may be identical to or different from the radio-frequency channel 201. For example, the radio-frequency integrated circuit 200 can comprise a radar circuit which emits and/or receives and processes signals having frequencies of 60 GHz and more. Furthermore, the radio-frequency channel and the radio-frequency integrated circuit 200 can comprise further switching elements, which are not shown in FIG. 2. In examples, the radio-frequency channel 201 can be a transmitting channel which is configured or is able to be configured to transmit MIMO signals. The first phase shifter 202 carries out first setting to a discrete phase value 212 based on the phase value (constellation point) predefined by the MIMO modulation. For this purpose, the first phase shifter 202 receives phase setting information 208 corresponding to a constellation point intended for the radio-frequency channel 201. The first phase shifter 202 can be configured to set only one set of discrete values selected from the range from 0° to 360°. In one example, the maximum number of values which are able to be set by the first phase shifter 202 can correspond exactly to the number of constellation points of the MIMO modulation. In other examples, the maximum number able to be set can also be higher. For this purpose, the first phase shifter 202 can be configured as a passive phase shifter which has a plurality of passive phase-shifting elements which can be digitally effectively connected into or disconnected from the signal path. One example of a passive phase shifter having digitally controllable passive phase-shifting elements will be explained in more detail below with reference to FIG. 4.

In the explained examples, the first phase shifter 202 requires no complex correction circuits or calibration circuits, rather it is accepted that the set discrete phase value 212 deviates from the phase value predefined by the MIMO modulation. A second passive phase shifter 204 is arranged downstream from and in series with the first phase shifter 202, which second passive phase shifter carries out fine-tuning of the phase in order to compensate for or reduce applicable errors of the first phase shifter 202. For this purpose, the second phase shifter 202 can be configured as a passive phase shifter which has a plurality of passive phase-shifting elements which can be digitally effectively connected into or disconnected from the signal path. One example of a passive phase shifter having digitally controllable passive phase-shifting elements will be explained in more detail below with reference to FIG. 4.

The second phase shifter 204 carries out fine-tuning of the phase, for example in a range from −5° to 5°. In other examples, the range can also be selected to be larger, for example from −10° to 10°, or smaller.

In order to carry out the fine-tuning, there is provision in FIG. 2 for a circuit 206 for ascertaining the correction values for a respective constellation point. The circuit 206 can be configured as a digital circuit, and be configured as hardware, software or a combination of hardware and software. The circuit 206 receives the phase setting information 208 of the presently provided constellation point and determines for this constellation point fine-tuning phase setting information 216 depending on further parameters such as, for example, temperature, present voltage of the power supply, calibration data, process data, etc. The fine-tuning phase setting information 216 is routed to the second phase shifter 204 in order to select the applicable phase-shifting elements which are to be effectively switched into the signal path. It should be mentioned here that the order in which the first phase shifter 202 and the second phase shifter 204 are arranged in the signal path can also be reversed, e.g., the second phase shifter 204 can be arranged upstream of the first phase shifter 202.

After the second phase shifter 204 has been used to carry out the phase setting, the signal in the signal path has a phase 214 which is corrected by the passive phase-shifting elements of the second phase shifter 204 which are effectively switched into the signal path, at least to the extent that artefacts which may result from imprecise phase settings do not occur or occur only to an insignificant degree.

It should be mentioned that the radio-frequency integrated circuit can have, in addition to the radio-frequency channel 201, at least one further radio-frequency channel which can have separate phase shifters to those in the radio-frequency channel 201, e.g., a third phase shifter for the rough setting and a fourth phase shifter for the fine-tuning with appropriate control as described above.

The concept of precise phase setting for MIMO applications without continual coverage of the whole range from 0 to 3600 will be explained with reference to FIG. 3.

Figure 3:
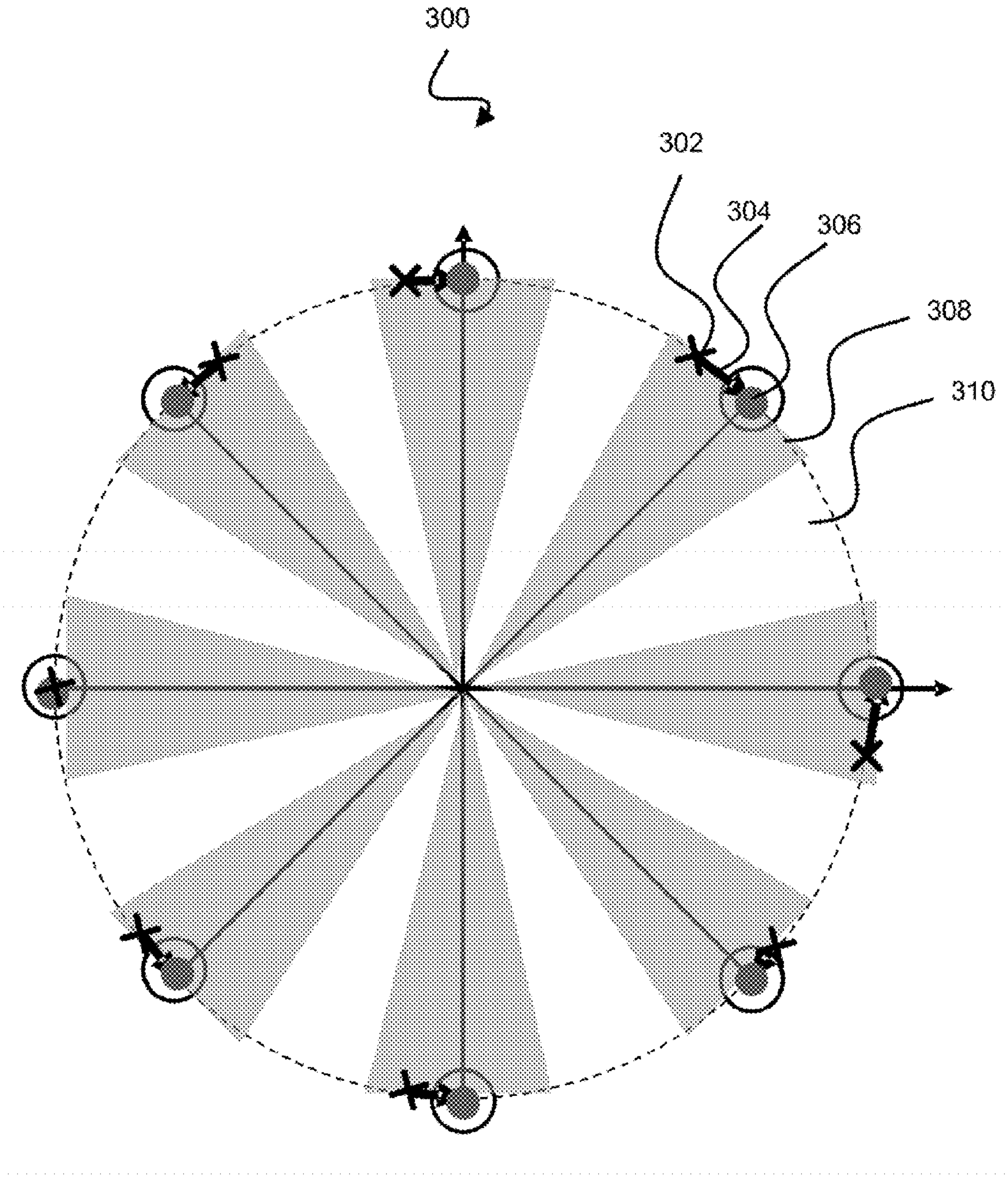
FIG. 3 shows a phase diagram according to one example.

FIG. 3 shows the discrete phase values 302 set by the first phase shifter 202 (rough setting), which may differ from the desired phase values 306 of a respective constellation point by a phase error 304. This phase error is reduced or corrected by the fine-tuning carried out by the second phase shifter 204 such that the resulting phase setting lies on the constellation point or in the immediate vicinity of the constellation point.

As can be seen in FIG. 3, a different phase error may be present for each of the constellation points, meaning that different fine-tuning settings are required for each of the constellation points.

It can furthermore be seen in FIG. 3 that the fine-tuning only causes a phase change in a relatively narrow phase range (for example from −5° to +5°) such that there are ranges 310 in which no phase setting can take place between successive constellation points. In other words, the different discrete predetermined phase values 306 of the constellation points for the MIMO modulation can differ at least by a minimum phase spacing (for example 22.5° in FIG. 3), with a maximum phase shift achievable by the second phase shifter 204, which maximum phase shift is specified by the absolute value of the difference between a minimum phase shift value and a maximum phase shift value of the second phase shifter 204 (dark area in FIG. 3), being less than the minimum phase spacing between the constellation points.

In order to carry out the individual fine-tuning for each constellation point depending on influencing parameters such as temperature, voltage, etc., one example can involve the use of a lookup table (LUT) in which predetermined fine-tuning settings are stored for each constellation point and for values of the influencing parameters.

FIG. 5 shows a lookup table 500 which contains phase correction values that have been accordingly ascertained for a plurality of constellation points and temperature values. These phase correction values can be used as a basis for ascertaining the respective digital control word for the second phase shifter 204. In another example, the required digital control word for the second phase shifter 204 can already be stored in the form of bits for activating or deactivating respective phase-shifting elements. It should furthermore be mentioned that the table can be of any desired size in order to take into consideration further influencing parameters such as a present voltage supply, for example.

One example of a passive phase shifter 400 will now be explained with reference to FIG. 4. The passive phase shifter 400 can be implemented for example in the second phase shifter 204. In examples, the passive phase shifter 400 can also be implemented in the first phase shifter, it being possible, however, for induction values of the coils and capacitance values of the capacitors to be considerably different, as already mentioned above. Implementing both the first and the second phase shifter 204 by way of digitally controllable passive phase shifters firstly allows the chip area to be considerably reduced and secondly allows precise phase setting to be achieved.

Figure 4:
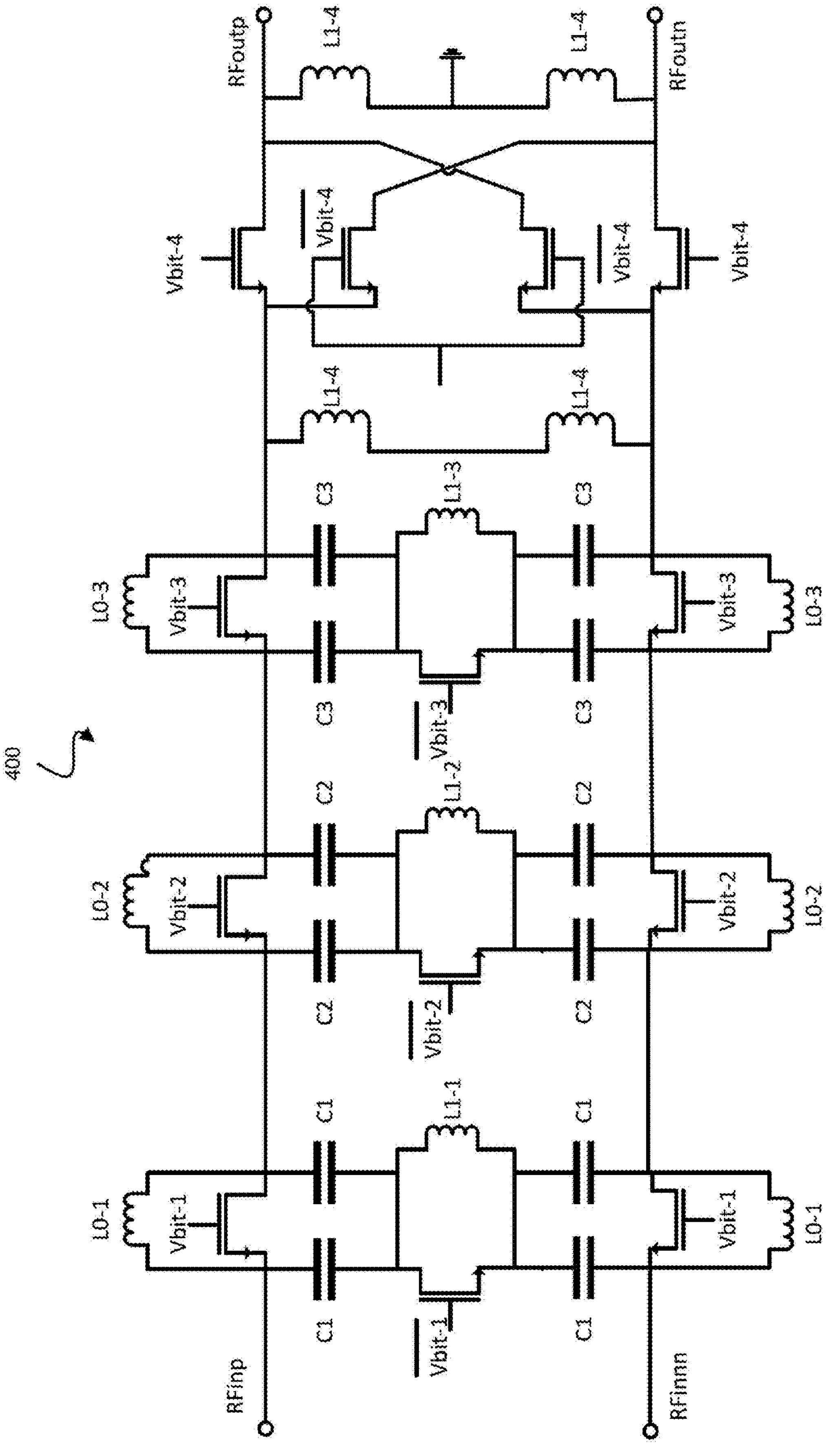
FIG. 4 shows a digitally controllable passive phase shifter according to one example.

The phase shifter 400 according to FIG. 4 represents a 4-stage differential phase shifter which has a differential input RFinp and RFinn and a differential output RFoutp and RFoutn. A first stage of the passive phase shifter is formed by the capacitors C1 and the inductors L0-1 and L1-1. The first stage is effectively switched into the signal path by virtue of transistors Vbit-1 being put into an OFF state and the resonator being closed by way of a transistor $\overline{\text{Vbit-1}}$. Conversely, the first stage is effectively disconnected from the signal path by virtue of the transistors Vbit-1 being closed and the transistor $\overline{\text{Vbit-1}}$ being put into the OFF state in order to interrupt the resonant circuit. The second stage has an identical design to the first stage, with the capacitors C2 and the inductors L0-2 and L1-2 being implemented in the second stage, however. Connection and disconnection is performed by way of transistors Vbit-2 and $\overline{\text{Vbit-2}}$. The third stage likewise has an identical design to the first and second stages, with the capacitors C3 and the inductors L0-3 and L1-3 being implemented in the third stage, however, in order to form the resonator. Connection and disconnection is performed by way of transistors Vbit-3 and $\overline{\text{Vbit-3}}$. The fourth stage differs from the preceding stages in that four inductors L1-4 form the resonator. Connection and disconnection is performed here by way of two transistors Vbit-4 and two transistors $\overline{\text{Vbit-4}}$. The transistors shown in FIG. 4 are configured as switches and form a switching network. Based on the received digital codes (Vbit-1, $\overline{\text{Vbit-1}}$ etc.), the switching network is set to effectively switch a selection of the plurality of phase-shifting elements into the radio-frequency channel in accordance with the digital code.

As can be seen, each of the stages has different capacitance and inductance values, which makes it easily possible to match the passive phase shifter to the respective function. In particular, the capacitance and inductance values of the first stage of the second phase shifter 204 also differ from those of the first stage of the first phase shifter 202, and so on. As a result, the phase shifter can be matched to the respective function (rough setting, fine-tuning) in a customized manner.

Figure 6:
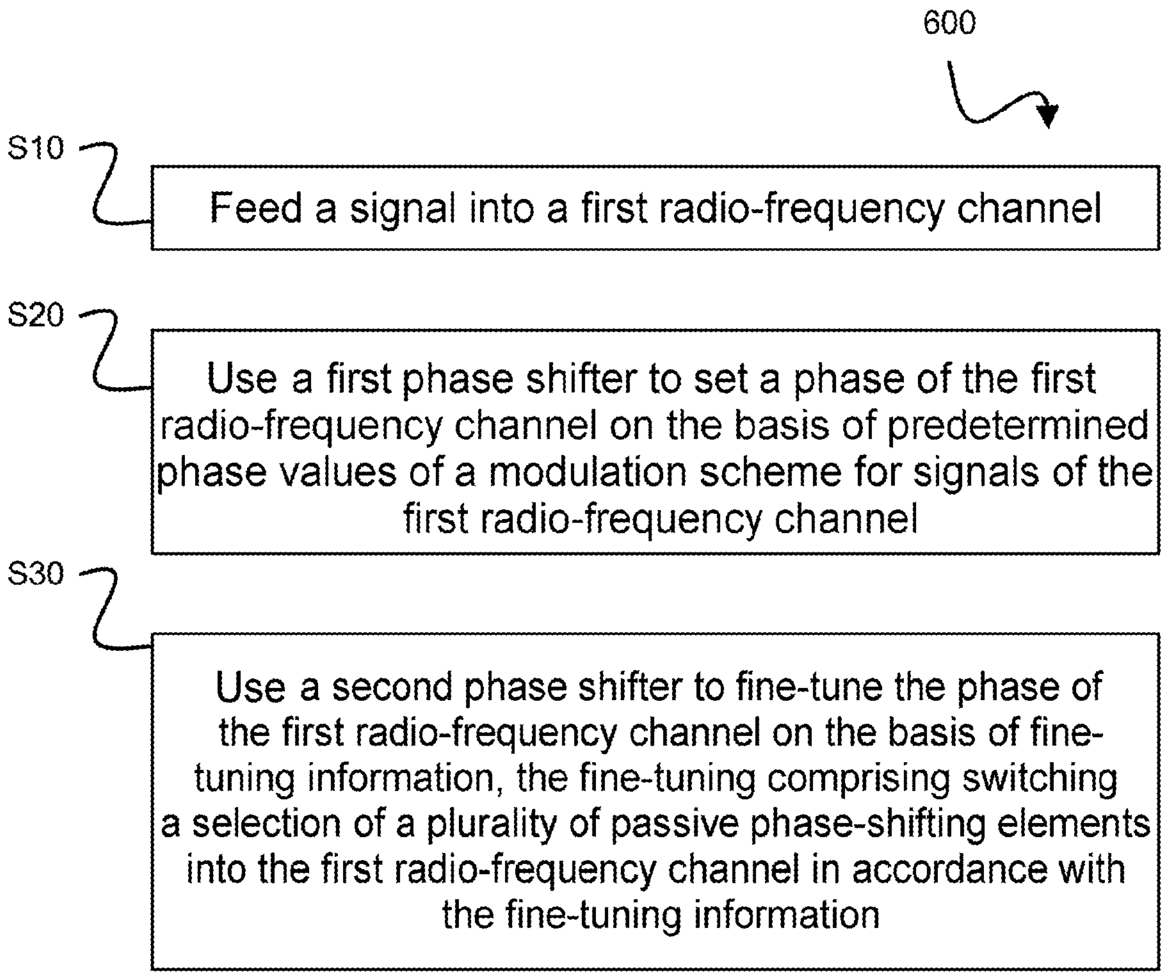
FIG. 6 shows an example of a method.

A method 600 for setting a phase will now be explained with reference to FIG. 6. In a step S10, a signal is fed into a first radio-frequency channel. The method comprises, in a step S20, setting a phase of the first radio-frequency channel based on predetermined phase values of a modulation scheme for signals of the first radio-frequency channel and, in a step S30, using a second phase shifter to fine-tune the phase of the first radio-frequency channel based on fine-tuning information, the fine-tuning comprising switching a selection of a plurality of passive phase-shifting elements into the first radio-frequency channel in accordance with the fine-tuning information.

ASPECTS

The present concept will be specified in more detail below using specific aspects.

Aspect 1 comprises a radio-frequency integrated circuit having the following features: a first radio-frequency channel; a first phase shifter in the first radio-frequency channel for setting a phase of the first radio-frequency channel based on predetermined phase values of a modulation scheme for signals of the first radio-frequency channel; and a second phase shifter in the first radio-frequency channel for fine-tuning the phase of the first radio-frequency channel based on fine-tuning information, the second phase shifter having a plurality of passive phase-shifting elements which are each able to be connected into the first radio-frequency channel or able to be disconnected from the first radio-frequency channel, the second phase shifter being configured to change a phase of the first radio-frequency channel by switching a selection of the plurality of passive phase-shifting elements into the first radio-frequency channel in accordance with the fine-tuning information.

Aspect 2 comprises a radio-frequency integrated circuit according to Aspect 1, the second phase shifter having a switching network and being configured to receive a digital fine-tuning code and to effectively switch the selection of the plurality of phase-shifting elements into the first radio-frequency channel in accordance with the fine-tuning code by setting the switching network.

Aspect 3 comprises a radio-frequency integrated circuit according to either of Aspects 1 and 2, the first phase shifter and the second phase shifter each being configured to be independent of each other.

Aspect 4 comprises a radio-frequency integrated circuit according to one of Aspects 1 to 3, the first phase shifter having a further plurality of further passive phase-shifting elements which set the first phase based on predetermined phase values of a modulation scheme, the passive phase-shifting elements being configured to be independent of the further passive phase-shifting elements.

Aspect 5 comprises a radio-frequency integrated circuit according to one of Aspects 1 to 4, the first phase shifter and the second phase shifter being configured to be functionally different.

Aspect 6 comprises a radio-frequency integrated circuit according to one of Aspects 1 to 3, the first phase shifter being configured as an active phase shifter which is configured to set any desired phase values in the first radio-frequency channel.

Aspect 7 comprises a radio-frequency integrated circuit according to one of Aspects 1 to 6, further having a digital circuit which is configured to generate the fine-tuning code based on phase correction data.

Aspect 8 comprises a radio-frequency integrated circuit according to Aspect 7, the digital circuit being configured to generate a fine-tuning code for each predetermined phase value selected for modulating the signal of the first radio-frequency channel, depending on the selected predetermined phase value.

Aspect 9 comprises a radio-frequency integrated circuit according to Aspect 8, the radio-frequency integrated circuit having a memory in which a lookup table is stored, the digital circuit being configured to generate a respective fine-tuning code based on the reading of a phase correction value which is stored in the lookup table, is assigned to the predetermined phase value and is selected for modulating the signal of the first radio-frequency channel.

Aspect 10 comprises a radio-frequency integrated circuit according to one of Aspects 7 to 9, the phase correction data being based at least on one of the following pieces of information: information representing variations during the manufacturing process, information representing variations in the supply voltage, or temperature information.

Aspect 11 comprises a radio-frequency integrated circuit according to Aspect 10, the radio-frequency integrated circuit having a memory in which a lookup table is stored, the digital circuit being configured to generate a respective fine-tuning code based on the reading of a phase correction value which is stored in the lookup table, is assigned to a temperature value and to the predetermined phase value and is selected for modulating the signal of the first radio-frequency channel.

Aspect 12 comprises a radio-frequency integrated circuit according to one of Aspects 1 to 11, the radio-frequency integrated circuit being a radar circuit integrated on a semiconductor chip, the first phase shifter being controlled to carry out phase setting in accordance with predetermined constellation points of a radar modulation scheme, the radar modulation scheme comprising a phase modulation scheme for a MIMO system.

Aspect 13 comprises a radio-frequency integrated circuit according to one of Aspects 1 to 12, the predetermined phase values being selected from a set of phase values, different phase values of the set of phase values differing at least by a first phase difference, and second phase values of the phase setting which are able to be set by the second phase shifter having a minimum phase shift value and a maximum phase shift value, an absolute value of a difference between the minimum phase shift value and the maximum phase shift value being less than an absolute value of the first phase difference.

Aspect 14 comprises a radio-frequency integrated circuit according to one of Aspects 1 to 13, the second phase shifter being configured such that an absolute value of a difference between a minimum phase shift value able to be set by the second phase shifter and a maximum phase shift value able to be set by the second phase shifter is less than or equal to 200.

Aspect 15 comprises a radio-frequency integrated circuit according to one of Aspects 1 to 14, the first radio-frequency channel being a transmitting channel and the radio-frequency integrated circuit having a local oscillator, the radio-frequency integrated circuit being configured to feed an output signal from the local oscillator into the first radio-frequency channel.

Aspect 16 comprises a radio-frequency integrated circuit according to one of the preceding aspects, the plurality of passive phase-shifting elements comprising a plurality of resonators.

Aspect 17 comprises a radio-frequency integrated circuit according to one of the preceding aspects, the first phase shifter effectively changing a phase at a first position in the first radio-frequency channel and the second phase shifter effectively changing a phase at a second position in the radio-frequency channel, the first position and the second position being one after another in relation to a signal processing direction of the radio-frequency channel.

Aspect 18 comprises a radio-frequency integrated circuit according to one of the preceding aspects, further having: a second radio-frequency channel; a third phase shifter in the second radio-frequency channel for setting a phase of the second radio-frequency channel based on predetermined phase values of a modulation scheme for signals of the second radio-frequency channel; and a fourth phase shifter in the second radio-frequency channel for fine-tuning the phase of the second radio-frequency channel based on fine-tuning information, the fourth phase shifter having a plurality of second passive phase-shifting elements which are each able to be connected into the second radio-frequency channel or able to be disconnected from the second radio-frequency channel, the fourth phase shifter being configured to change a phase of the second radio-frequency channel by switching a selection of the plurality of second passive phase-shifting elements in accordance with the fine-tuning information.

Aspect 19 comprises a method for setting a phase in a first radio-frequency channel, having the following steps: feeding a signal into the first radio-frequency channel; using a first phase shifter to set a phase of the first radio-frequency channel based on predetermined phase values of a modulation scheme for signals of the first radio-frequency channel; using a second phase shifter to fine-tune the phase of the first radio-frequency channel based on fine-tuning information, the fine-tuning comprising switching a selection of a plurality of passive phase-shifting elements into the first radio-frequency channel in accordance with the fine-tuning information.

It should be pointed out that the description and the drawings only illustrate the principles of the proposed methods and apparatuses. Those skilled in the art will be capable of implementing different arrangements which, although they are not expressly described or shown here, embody the principles of the implementation and are contained within the scope thereof. In addition, all aspects and implementations outlined in the present document are intended fundamentally and expressly for explanatory purposes only, in order to help the reader understand the principles of the proposed methods and apparatuses. In addition, all statements in this document which describe principles, aspects and implementations of the implementation and specific aspects thereof are also intended to comprise their equivalents.

The invention claimed is:

1. A radio-frequency integrated circuit, comprising:

a first radio-frequency channel;

a first phase shifter in the first radio-frequency channel configured to set a phase of the first radio-frequency channel based on predetermined phase values of a modulation scheme for signals of the first radio-frequency channel; and a second phase shifter in the first radio-frequency channel configured to fine-tune the phase of the first radio-frequency channel based on fine-tuning information, the second phase shifter having a plurality of passive phase-shifting elements which are each able to be connected into the first radio-frequency channel or able to be disconnected from the first radio-frequency channel, the second phase shifter being configured to change a phase of the first radio-frequency channel by switching a selection of the plurality of passive phase-shifting elements into the first radio-frequency channel in accordance with the fine-tuning information, wherein the plurality of passive phase-shifting elements comprises a plurality of resonators.

2. The radio-frequency integrated circuit as claimed in claim 1, wherein the second phase shifter includes a switching network and is configured to:

receive a digital fine-tuning code, and effectively switch the selection of the plurality of passive phase-shifting elements into the first radio-frequency channel in accordance with the digital fine-tuning code by setting the switching network.

3. The radio-frequency integrated circuit as claimed in claim 1, wherein the first phase shifter and the second phase shifter are each configured to be independent of each other.

4. The radio-frequency integrated circuit as claimed in claim 1, wherein the plurality of passive phase-shifting elements comprises a first plurality of passive phase-shifting elements, wherein the first phase shifter includes a second plurality of passive phase-shifting elements, wherein the second plurality of passive phase-shifting elements are configured to set the first phase shifter based on the predetermined phase values of the modulation scheme, and wherein the first plurality of passive phase-shifting elements are configured to be independent of the second plurality of passive phase-shifting elements.

5. The radio-frequency integrated circuit as claimed in claim 1, wherein the first phase shifter is configured to be functionally different from the second phase shifter.

6. The radio-frequency integrated circuit as claimed in claim 1, wherein the first phase shifter is configured as an active phase shifter which is configured to set phase values in the first radio-frequency channel.

7. The radio-frequency integrated circuit as claimed in claim 1, further comprising:

a digital circuit, wherein the digital circuit is configured to generate the fine-tuning information based on phase correction data.

8. The radio-frequency integrated circuit as claimed in claim 7, wherein the digital circuit is further configured to:

generate a fine-tuning code for each predetermined phase value of the predetermined phase values selected for modulating the signals of the first radio-frequency channel.

9. The radio-frequency integrated circuit as claimed in claim 8, wherein the radio-frequency integrated circuit further comprises:

a memory storing a lookup table, wherein the digital circuit is configured to generate a respective fine-tuning code based on a reading of a phase correction value which is:

stored in the lookup table, assigned to a selected predetermined phase value, and selected for modulating a signal of the first radio-frequency channel.

10. The radio-frequency integrated circuit as claimed in claim 7, wherein the phase correction data is based at least on one of:

information representing variations during a manufacturing process, information representing variations in a supply voltage, or temperature information.

11. The radio-frequency integrated circuit as claimed in claim 10, wherein the radio-frequency integrated circuit further comprises:

a memory storing a lookup table, wherein the digital circuit is configured to generate a respective fine-tuning code based on a reading of a phase correction value which is stored in the lookup table, is assigned to a temperature value and to the predetermined phase value, and is selected for modulating the signals of the first radio-frequency channel.

12. The radio-frequency integrated circuit as claimed in claim 1, wherein the radio-frequency integrated circuit comprises a radar circuit integrated on a semiconductor chip, the first phase shifter being controlled to carry out phase setting in accordance with predetermined constellation points of a radar modulation scheme, the radar modulation scheme comprising a phase modulation scheme for a multiple input multiple output (MIMO) system.

13. The radio-frequency integrated circuit as claimed in claim 1, wherein the predetermined phase values are selected from a set of phase values, wherein different phase values of the set of phase values differ at least by a first phase difference, and wherein second phase values of the phase setting which are able to be set by the second phase shifter have a minimum phase shift value and a maximum phase shift value, wherein an absolute value of a difference between the minimum phase shift value and the maximum phase shift value is less than an absolute value of the first phase difference.

14. The radio-frequency integrated circuit as claimed in claim 1, wherein the second phase shifter is configured such that an absolute value of a difference between a minimum phase shift value able to be set by the second phase shifter and a maximum phase shift value able to be set by the second phase shifter is less than or equal to 20°.

15. The radio-frequency integrated circuit as claimed in claim 1, wherein the first radio-frequency channel comprises a transmitting channel and the radio-frequency integrated circuit includes a local oscillator, and wherein the radio-frequency integrated circuit is configured to feed an output signal from the local oscillator into the first radio-frequency channel.

16. The radio-frequency integrated circuit as claimed in claim 1, wherein the first phase shifter is configured to effectively change a phase at a first position in the first radio-frequency channel and the second phase shifter is configured to effectively change a phase at a second position in the radio-frequency channel, the first position and the second position being one after another in relation to a signal processing direction of the radio-frequency channel.

17. The radio-frequency integrated circuit as claimed in claim 1, further comprising:

a second radio-frequency channel;

a third phase shifter in the second radio-frequency channel configured to set a phase of the second radio-frequency channel based on predetermined phase values of a modulation scheme for signals of the second radio-frequency channel; and a fourth phase shifter in the second radio-frequency channel configured to fine-tune the phase of the second radio-frequency channel based on fine-tuning information, the fourth phase shifter having a plurality of second passive phase-shifting elements which are each able to be connected into the second radio-frequency channel or able to be disconnected from the second radio-frequency channel, the fourth phase shifter being configured to change a phase of the second radio-frequency channel by switching a selection of the plurality of second passive phase-shifting elements in accordance with the fine-tuning information.

18. A method for setting a phase in a radio-frequency channel, the method comprising:

feeding a signal into the radio-frequency channel;

using a first phase shifter to set a phase of the radio-frequency channel based on predetermined phase values of a modulation scheme for signals of the radio-frequency channel; and using a second phase shifter to fine-tune the phase of the radio-frequency channel based on fine-tuning information, the fine-tuning comprising switching a selection of a plurality of passive phase-shifting elements into the radio-frequency channel in accordance with the fine-tuning information, wherein the plurality of passive phase-shifting elements comprises a plurality of resonators.

19. A radio-frequency integrated circuit, comprising:

a first radio-frequency channel;

a first phase shifter in the first radio-frequency channel configured to set a phase of the first radio-frequency channel based on predetermined phase values of a modulation scheme for signals of the first radio-frequency channel; and a second phase shifter in the first radio-frequency channel configured to fine-tune the phase of the first radio-frequency channel based on fine-tuning information, the second phase shifter having a plurality of passive phase-shifting elements which are each able to be connected into the first radio-frequency channel or able to be disconnected from the first radio-frequency channel, the second phase shifter being configured to change a phase of the first radio-frequency channel by switching a selection of the plurality of passive phase-shifting elements into the first radio-frequency channel in accordance with the fine-tuning information, wherein the plurality of passive phase-shifting elements are combinable for selection such that one or more passive phase-shifting elements are effectively switched into the first radio-frequency channel to change the phase, and wherein at least one phase change is effected by two or more passive phase-shifting elements of the plurality of passive phase-shifting elements.

20. The radio-frequency integrated circuit as claimed in claim 19, wherein the plurality of passive phase-shifting elements comprises a plurality of resonators.

* * * * *